(12) United States Patent
Brown et al.

(10) Patent No.: US 10,119,874 B2
(45) Date of Patent: Nov. 6, 2018

(54) AMORPHOUS QUARTZ PRESSURE TRANSDUCER

(71) Applicant: Fluke Corporation, Everett, WA (US)

(72) Inventors: Timothy Byron Brown, Everett, WA (US); Eric Lane Solis, Bothell, WA (US)

(73) Assignee: Fluke Corporation, Everett, WA (US)

( * ) Notice: Subject to any disclaimer, the term of this patent is extended or adjusted under 35 U.S.C. 154(b) by 214 days.

(21) Appl. No.: 15/222,711

(22) Filed: Jul. 28, 2016

(65) Prior Publication Data

US 2018/0031432 A1 Feb. 1, 2018

(51) Int. Cl.
| | |
|---|---|
| *G01L 1/10* | (2006.01) |
| *G01L 7/00* | (2006.01) |
| *G01L 7/04* | (2006.01) |
| *G01L 9/00* | (2006.01) |
| *G01L 19/04* | (2006.01) |

(52) U.S. Cl.
CPC ............... *G01L 7/04* (2013.01); *G01L 1/10* (2013.01); *G01L 7/048* (2013.01); *G01L 9/0008* (2013.01); *G01L 9/0026* (2013.01); *G01L 9/0041* (2013.01); *G01L 19/04* (2013.01)

(58) Field of Classification Search
CPC ..... G01L 1/10; G01L 7/00; G01L 7/04; G01L 7/048; G01L 9/00; G01L 9/0008; G01L 9/0026; G01L 9/0041; G01L 19/04
See application file for complete search history.

(56) References Cited

U.S. PATENT DOCUMENTS

| | | | |
|---|---|---|---|
| 3,346,830 A | 10/1967 | Ankeny | |
| 3,561,832 A * | 2/1971 | Karrer et al. | ........... E21B 47/06 |
| | | | 310/338 |
| 3,780,589 A | 12/1973 | Fruit | |
| 3,915,009 A | 10/1975 | Worden et al. | |
| 4,382,385 A | 5/1983 | Paros | |
| 4,455,874 A | 6/1984 | Paros | |

(Continued)

FOREIGN PATENT DOCUMENTS

| | | | |
|---|---|---|---|
| GB | 329209 | 5/1930 | |
| JP | 02228534 A * | 9/1990 | ............... G01L 9/00 |

OTHER PUBLICATIONS

Vallin et al., "Direct Bonded Quartz Resonators," *2001 IEEE International Frequency Control Symposium and PDA Exhibition*, pp. 345-348.

(Continued)

*Primary Examiner* — Nguyen Ha
(74) *Attorney, Agent, or Firm* — Seed Intellectual Property Law Group LLP (57) ABSTRACT

A pressure transducer comprising a flexible member made of amorphous quartz and a crystalline quartz sensor are coupled together without an adhesive material. Instead, the amorphous quartz and the crystalline quartz sensor are coupled together at the molecular level. In some embodiments, the crystalline quartz sensor remains in compression or tension during the entire operating range of the pressure transducer. In one embodiment, the crystalline quartz sensor is pre-stressed in either compression or tension when the pressure transducer is exposed to atmospheric pressure. In one embodiment, pressure transducer is located in pressure stabilizing system.

22 Claims, 6 Drawing Sheets

(56) References Cited

U.S. PATENT DOCUMENTS

| | | | |
|---|---|---|---|
| 6,497,152 B2 | 12/2002 | Paros et al. | |
| 8,015,881 B2 * | 9/2011 | Motoyama | G01L 9/0033 73/717 |
| 2007/0164633 A1 | 7/2007 | Cobianu et al. | |
| 2012/0216621 A1 * | 8/2012 | Oto | G01L 9/008 73/715 |

OTHER PUBLICATIONS

Yilmaz et al., "Broadband Vibrating Quartz Pressure Sensors for Tsunameter and Other Oceanographic Applications," *Oceans 2004*, IEEE, Kobe, Japan, pp. 1381-1387.

* cited by examiner

AMORPHOUS QUARTZ PRESSURE TRANSDUCER

BACKGROUND

Technical Field

Embodiments are directed to pressure transducers and calibration instruments.

Description of the Related Art

Generally described, Bourdon tubes are tubes that flex radially, by coiling and uncoiling, in response to pressure changes between the tube and it surrounding environment. A sensor, such as a resonant sensor, may be attached to a closed end of the tube so that as the tube flexes, the movement imparts a force on the resonant sensor. The frequency at which the resonant sensor resonates due to the force is indicative of the pressure in the tube.

Typically, Bourdon tubes are made from a metal material. The metal material, however, has been shown to cause hysteresis, a phenomenon that can affect the true measurement of the Bourdon tube. In particular, hysteresis occurs due to metal Bourdon tubes retaining some energy between measurements. For instance, the metal Bourdon tube may retain deformations for a period of time after a measurement has been obtained. Thus, during a subsequent measurement that occurs during the period of time in which the Bourdon tube is deformed, the deformity affects the measurement, thereby contributing error to the subsequent measurement. Although metal is described as causing hysteresis, adhesive materials, such as epoxy, which bond the metal Bourdon tube to various components within a Bourdon tube pressure transducer, can also cause hysteresis, as can stress in the mounting or structural materials throughout the device.

BRIEF SUMMARY

One or more embodiments are directed to a pressure transducer comprising a flexible member made of amorphous quartz and a crystalline quartz sensor that are coupled together without an adhesive material. Rather, the amorphous quartz of the flexible member and the crystalline quartz sensor are coupled together at the molecular level. The bonding may be encouraged by the application of one or more of heat, water, solvents, and additives, such as salt, at the joining surfaces to encourage intermolecular bonding therebetween.

The flexible member is a Bourdon tube mechanism in at least one embodiment. In at least one embodiment, the crystalline quartz sensor is pre-stressed in either compression or tension when, for instance, the pressure transducer is exposed to atmospheric pressure. In that regard, the quartz sensor may be able to self-orient and substantially restrict to remain within the linear motion of the flexible member. In some embodiments, the crystalline quartz sensor remains in compression or tension during the entire operating range.

One embodiment of the present disclosure is directed to a pressure transducer comprising a Bourdon tube mechanism of amorphous quartz having a tube with a closed end and an open end. The open end of the tube is configured to be placed in fluid communication with a fluid and to receive the fluid into the tube. The closed end of the tube is configured to flex in response to a change in pressure in the tube. The pressure transducer further includes a support structure of amorphous quartz coupled to the Bourdon tube mechanism without an adhesive material. The pressure transducer further includes a crystalline quartz sensor coupled between the closed end of the tube and the support structure. The crystalline quartz sensor is in tension or compression for the operating range of the pressure transducer.

Another embodiment of the present disclosure is directed to a pressure transducer comprising a flexible member made of amorphous quartz. The flexible member is configured to move in response to pressure changes. The pressure transducer further includes a support structure coupled to the flexible member and a crystalline quartz sensor. The crystalline quartz sensor has a first end coupled to the flexible member and a second end coupled to the support structure. The first and second ends of the crystalline quartz sensor are molecularly bonded to the flexible member and the support structure, respectively. The crystalline quartz sensor is configured to detect a force associated with movement of the flexible member.

Another embodiment is directed to a calibration instrument comprising a pressure transducer and a microprocessor coupled to the pressure transducer. The pressure transducer includes a Bourdon tube made of amorphous quartz and having a closed end and an open end. The open end of the Bourdon tube is configured to receive a fluid, and the closed end is configured to flex in response to a change in pressure in the Bourdon tube. The pressure transducer further includes a crystalline quartz sensor coupled to the closed end of the Bourdon tube. The crystalline quartz sensor is in tension or compression for an operating range of the pressure transducer.

DETAILED DESCRIPTION

As will be explained in detail below, the pressure transducers described herein have many components being made of amorphous quartz, for example fused silica or fused quartz, such as silicon dioxide ($SiO_2$), and a resonant sensor made of crystalline quartz. In one or more embodiments, various amorphous quartz components and the crystalline quartz are bonded together without the use of an adhesive material, such as epoxy, thereby reducing the likelihood of hysteresis occurring during the operation of the pressure transducer. Rather, bonding between the components occurs at the molecular level. The bonding includes the application of one or more of heat, water, solvents, and additives, such as salt, to the joining surfaces to encourage intermolecular bonding therebetween, but does not include an adhesive material. For instance, in one embodiment salt silica is used as a bonding agent to create semi-homogeneous bonding between fused silica and the crystalline silica resonant sensor. The salt silica is also referred to as waterglass, which is a salt silicate solution that devolves into glass when it becomes anhydrous. Salt silica may also refer to sodium silicate, potassium silicate or other metal salts.

Figure 1A:
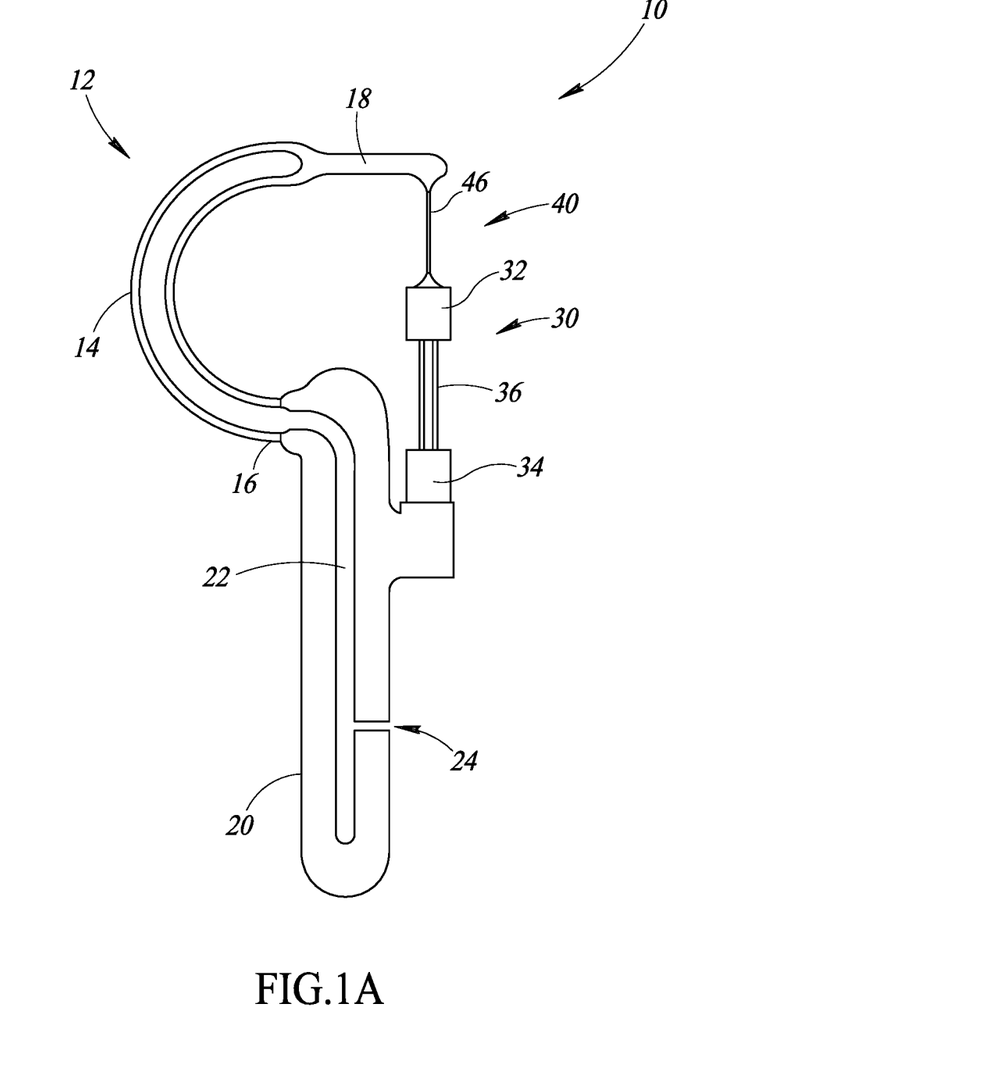
FIG. 1A is a schematic cross-section view of a Bourdon tube pressure transducer in a first position in accordance with one embodiment.
Figure 1B:
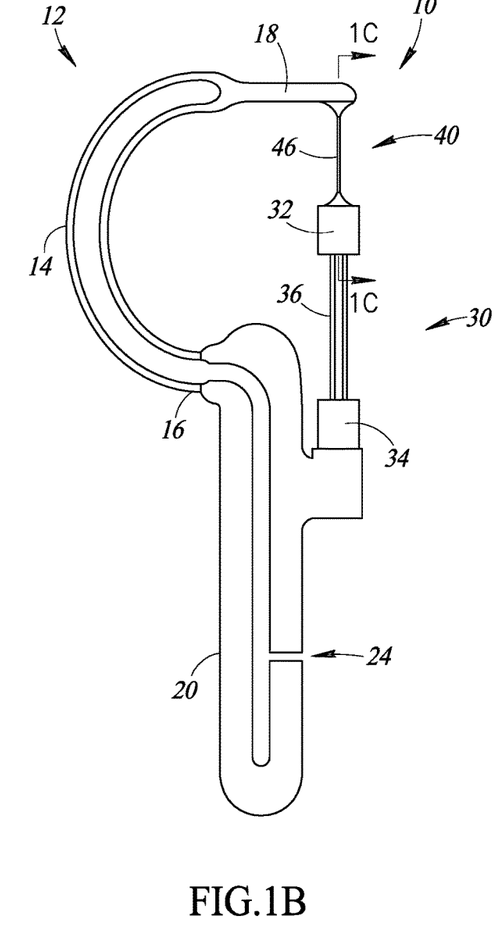
FIG. 1B is a schematic cross-section view of the Bourdon tube pressure transducer of FIG. 1A in a second position.
Figure 1C:
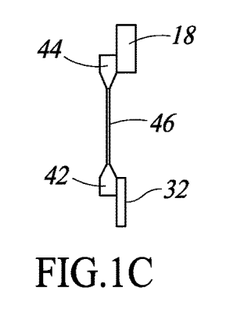
FIG. 1C is a schematic partial cross-section view of the Bourdon tube pressure transducer of FIG. 1B.

FIGS. 1A-1C are directed to a Bourdon tube pressure transducer 10 in accordance with at least one embodiment of the disclosure. In FIG. 1A, the Bourdon tube pressure transducer 10 is in a first position, and in FIG. 1B, the Bourdon tube pressure transducer 10 is in a second position. FIG. 1C is a cross-section view of a portion of the Bourdon tube pressure transducer 10 as indicated in FIG. 1B.

The Bourdon tube pressure transducer 10 includes a Bourdon tube mechanism 12 that includes an amorphous quartz tube 14 curved into a C-shape; however, the tube may be in other shapes, such as U-shaped, circular, and helical. The tube 14 is a hollow tube that is open at an open end 16 and closed at an opposite, closed end 18. The tube is made of an amorphous quartz, which is an elastic material that flexes in response to pressure being applied thereto, while at the same time is a sufficiently rigid to allow for a variety of different pressure ranges depending on the thickness and shape of the tube 14. Thus, as pressure inside of the tube changes, the closed end 18 moves, such as by flexing upward, relative to the open end 16.

The open end 16 of the tube 14 is coupled to a support structure 20. The support structure 20 has a channel 22 having a first opening that is in fluid communication with tube 14 at the open end 16 of the tube 14 and a second opening 24 that places the channel 22, and thus the tube 14, in fluid communication with an environment external to the Bourdon tube pressure transducer 10. During operation, the second opening 24 of the channel 22 is configured to receive a fluid, such as a gas or liquid, to be tested and the fluid travels through the channel 22 to the tube 14.

The support structure 20 is also made of amorphous quartz. The support structure 20 is coupled to the tube 14 at the open end 16 of the tube 14. The support structure 20 and the tube 14 are coupled together without the use of an adhesive material. Rather, the amorphous quartz of the support structure 20 and the amorphous quartz of the tube 14 are coupled together by molecular bonding. As mentioned above, the bonding between the tube 14 and the support structure 20 may be encouraged by one or more of heat, water, solvents, and additives, such as salt.

The Bourdon tube pressure transducer 10 further includes a crystalline sensor 30. The crystalline sensor 30 has a first end plate 32 coupled to the Bourdon tube mechanism 12 at the closed end 18 of the tube 14, the details of which will be discussed in more detail later. The crystalline sensor 30 has a second end plate 34 coupled to the support structure 20. The second end plate 34 is coupled to the support structure 20 without an adhesive material. Rather, the crystalline material of the second end plate 34 molecularly bonds with the amorphous quartz of the support structure 20. The intermolecular bonding may be encouraged by one or more of heat, water, solvents, and additives, such as salt, at the joining surfaces.

The crystalline sensor 30 is configured to be stretched in response to the second end 18 of the tube 14 flexing upward relative to the open end 16 of the tube 14. The crystalline sensor 30 is a resonant force sensor that has natural resonant frequencies that are a function of the force being applied thereto. In particular, between the first and second end plates 32, 34 of the crystalline sensor 30 are two resonant beams 36 that are configured to resonate in response to a force being applied to the crystalline sensor 30. The frequency at which the resonant beams 36 resonate is dependent on the force being applied to the crystalline sensor 30. In that regard, the resonant beams 36 are configured to resonate within a range of frequencies. For instance, the resonant beams 36 are configured to resonate at a first natural resonant frequency when the closed end 18 of the tube 14 of the Bourdon tube mechanism 12 is in the first position shown in FIG. 1A, and resonate at a second natural resonant frequency when the closed end 18 of the tube 14 of the Bourdon tube mechanism 12 is in the second position shown in FIG. 1B. In the second position, the pressure in the tube 14 is greater than the pressure in the tube 14 in the first position. It is to be appreciated that the resonant beams 36 may resonate under tension and/or compression.

The frequency at which the resonant beams 36 of the crystalline sensor 30 resonate not only depends on force but also depends on the temperature of the crystalline sensor 30. That is, measurements of the resonant beams 36 can also be affected by heat transferred to the crystalline sensor 30. For instance, the Bourdon tube mechanism 12 may be exposed to fluids of varying temperatures and transfer those changes to the crystalline sensor 30, thereby affecting the true measurement. Thus, to thermally isolate the crystalline sensor 30 from the bourdon tube mechanism 12, there is provided a filament member 40 between the first end plate 32 of the crystalline sensor 30 and the closed end 18 of the Bourdon tube mechanism 12.

As best shown in the cross-section view of FIG. 1C, the filament member 40 includes first and second planar elements 42, 44 located between a filament 46. The first planar element 42 is coupled to a surface of the first end plate 32 of the crystalline sensor 30 and the second planar element 44 that is coupled to the closed end 18 of the tube 14. The first and second planar elements 42, 44 are coupled to the first end plate 32 of the crystalline sensor 30 and closed end 18 of the tube 14, respectively, without an adhesive material. As mentioned above, the bonding process may include the addition of one or more of heat, water, solvents, and additives, such as salt, at the joining surfaces.

The filament 46 has a reduced cross-sectional area relative to a cross-sectional area of the Bourdon tube mechanism, such as relative to the closed end 18 of the tube 14. For instance, the filament 46 may have a diameter that is 0.5% to 15% of a diameter of the tube 14.

Thus, by providing a filament 46 with a reduced cross-sectional area as described above between the closed end 18 of the tube 14 and the first end plate 32 of the crystalline sensor 30, changes in temperature introduced to the tube 14 during operation are not transferred to the crystalline sensor 30 or are at least substantially reduced. In that regard, the accuracy and/or precision of the crystalline sensor 30 is improved.

The Bourdon tube mechanism 12, when not in operation, is at rest in a neutral position, which in at least one embodiment is the position shown in FIG. 1A. In operation, the opening 24 of the support structure 20 is placed in fluid communication with a fluid, such as a gas or a liquid, for determining a pressure thereof. When, for example, fluid enters the tube 14 and increases the pressure therein, the closed end 18 of the tube 14 begins to uncoil or straighten out, such as to the position shown in FIG. 1B, thereby placing the crystalline sensor 30 under tension or under further tension. The tensioned crystalline sensor 30 resonates at a resonant frequency that is proportional to the pressure. Conversely, as pressure in the Bourdon tube mechanism 12 decreases, the closed end 18 of the amorphous quartz tube 14 curls or moves downward, such as to the position shown in FIG. 1A. The geometry of the tube 14 may be adjusted depending on desired range of forces to be measured by the crystalline sensor 30.

In one embodiment, the crystalline sensor 30 and the filament member 40 are arranged linearly with each other along a line of movement or parallel to the line of movement of the closed end 18 of the tube 14. In general, the Bourdon tube mechanism 12 moves substantially radially. That is, the closed end 18 of the tube 14 uncoils in a motion that is radial to a fixed point of the Bourdon tube mechanism 12, such as the open end 16 of the tube 14. Thus, the line of movement is defined as a line that is tangent to the curving motion of the closed end 18 of the tube 14. By aligning a longitudinal axis of the crystalline sensor 30 and a longitudinal axis of the filament to be parallel with the tangent of the curving motion of the closed end 18 of the tube 14, measurement losses are reduced. That is, the resonant beams 36 are stretched or compressed uniaxially, rather than placing a moment force on the resonant beams 36, thereby improving the accuracy and precision of the measurement.

In one embodiment, the crystalline sensor 30 is tensioned across the entire operating range of the Bourdon tube pressure transducer 10. In particular, the crystalline sensor 30 is pre-tensioned, such that when the Bourdon tube mechanism 12 is in its neutral position, the crystalline sensor 30 is already under tension at atmospheric pressure, resulting in sensor 30 remaining under tension at a lowest pressure, such as a vacuum, for a particular application, throughout the entire range of the pressure sensor to a highest pressure for the particular application. For instance, in this embodiment the position of the Bourdon tube pressure transducer 10 of FIG. 1B may be the initial, neutral position. When fluid exits the tube 14, decreasing the pressure therein, the Bourdon tube mechanism 12 begins to coil, thereby reducing the tensioning on the crystalline sensor 30, which places the Bourdon tube mechanism 12 in the position shown in FIG. 1A. Conversely, in reference to FIG. 1B being the initial position and fluid entering the tube increases the pressure therein, the Bourdon tube mechanism 12 continues to uncoil or straighten out farther than the position shown in FIG. 1B, thereby placing the crystalline sensor 30 under further tension.

By maintaining the crystalline sensor 30 in tension over the entire operating range, translation of pressure into an output signal can be more linear. It is to be appreciated that when the crystalline sensor 30 transitions between compression and tension, the crystalline sensor 30 may include some out-of-plane movement that adversely affects the true measurement value. That is, the movement of the crystalline sensor 30 has a first vector component that is parallel to the longitudinal axis of the crystalline sensor 30 and has a second, smaller vector component that is perpendicular to the longitudinal axis of the crystalline sensor 30. Although the second vector component will be substantially smaller than the first vector component, the second vector component will introduce an error into the output of the sensor. Thus, by maintaining the crystalline sensor 30 in tension over the entire operating range of the Bourdon tube pressure transducer 10, the accuracy and precision of the Bourdon tube pressure transducer 10 is improved.

Although the above embodiment described the crystalline sensor 30 being in tension for the entire operating range, it will be apparent to the person of ordinary skill in the art that the pre-stressing of the crystalline sensor 30 could apply to compression as well.

As mentioned above, the Bourdon tube mechanism 12, the support structure 20, and the filament member 40 are all made from amorphous quartz. In one embodiment, the Bourdon tube mechanism 12, the support structure 20, and the filament member 40 are made from the same type of amorphous quartz, such as fused silica or fused quartz, and are fused together without the use of a non-glass adhesive material. By making these components of the same material any warpage that might occur during operation due to materials having differing coefficients of thermal expansion (CTE) is eliminated. Furthermore, creep, which is known to occur in adhesive materials such as epoxy, is reduced or eliminated.

Figure 2:
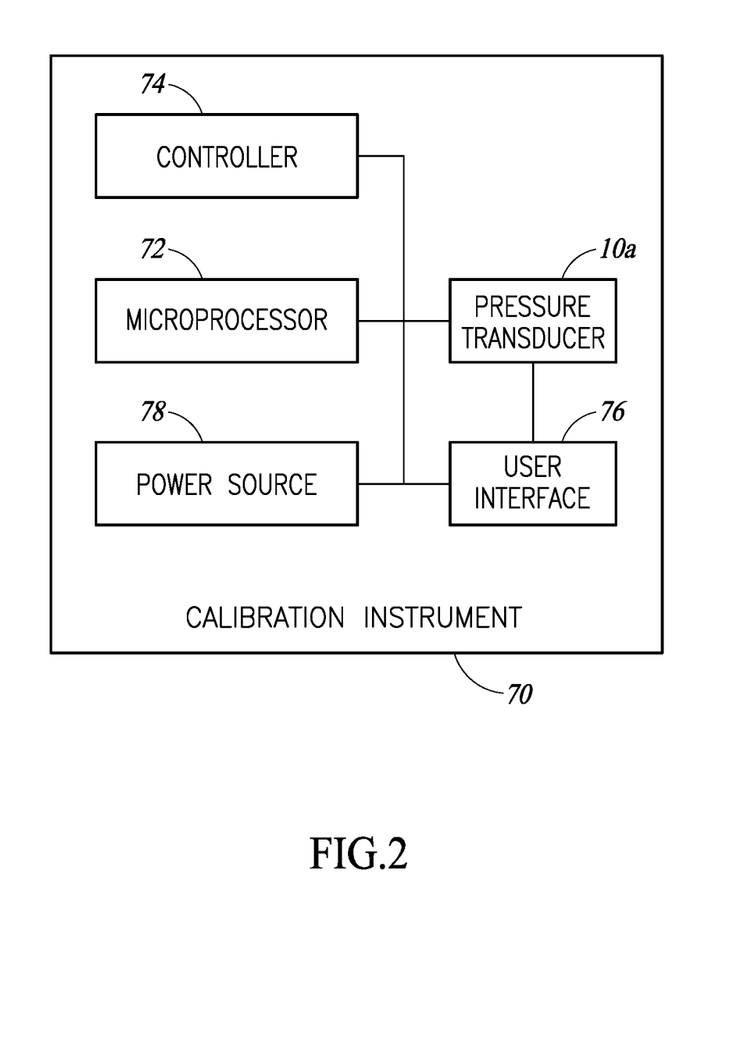
FIG. 2 is a block diagram of a calibration instrument that includes a pressure transducer in accordance with one embodiment.

FIG. 2 is a block diagram of a pressure calibrator 70 in accordance with at least one embodiment of the present disclosure. The pressure calibrator 70 includes a pressure transducer 10a, such as the Bourdon tube pressure transducer 10 of FIG. 1A-1C, a microprocessor 72, a controller 74, a user interface 76, and a power source 78. The Bourdon tube pressure transducer 10 is electrically coupled to the microprocessor 72. In particular, conductive wires may be coupled to the first and/or second end plates 32, 34 of the crystalline sensor 30 and to the microprocessor 72. Between the microprocessor 72 and the Bourdon tube pressure transducer 10 may be an amplifier to amplify the signals being provided from the Bourdon tube pressure transducer 10 to the microprocessor 72, as is well known in the art.

The microprocessor 72 includes suitable logic to receive signals from the Bourdon tube pressure transducer 10, generate pressure values associated with the resonant frequencies of the crystalline sensor 30 of the pressure transducer 10, and provide the pressure values to the user interface 76. The microprocessor 72 may further include suitable logic to store the pressure values or use additional information, such as temperature, to modify the output signal, as is well known in the art. Alternatively, the pressure calibrator 70 includes a separate memory for storing the pressure values.

The user interface 76 is coupled to the controller 74 and the microprocessor 72, and may be further coupled to the pressure transducer 10a. The user interface 76 may include a display, keyboard, knobs and buttons that allow a user to interact with the microprocessor 72 and the controller 74. For instance, a display of the user interface 76 may display the pressure generated by the microprocessor 72.

The controller 74 is electrically coupled to the microprocessor 72, the pressure transducer 10a, the user interface 76, and the power source 78. The controller 74 includes suitable control for causing valves within the calibration instrument 70 to open and close, such as, for example, supply valves and exhaust valves. The controller 74 may open and close the valves in response to receiving signals from the user interface. In one embodiment, the controller 74 and the microprocessor 72 are a single component.

The power source 78, which can be a battery or a plug for coupling to a main power supply, provides power for operating the calibration instrument.

While the foregoing description illustrates and describes a Bourdon tube pressure transducer, it should be understood that the pressure transducer may be of a type other than Bourdon tube. For instance, in one embodiment, there is provided a pressure transducer including a flexible member made of amorphous quartz and a support structure coupled to the flexible member. The flexible member is configured to move in response to pressure changes. The pressure transducer further includes a crystalline quartz sensor having a first end coupled to the flexible member and a second end coupled to the support structure. The first and second ends of the crystalline quartz sensor are molecularly bonded to the flexible member and the support structure, respectively. The crystalline quartz sensor is configured to detect a force associated with movement of the flexible member.

Furthermore, although not shown in the illustrated embodiment, the crystalline sensor 30 may be coupled directly to the closed end 18 of the tube 14 without a filament member 40 therebetween. In other embodiments, the Bourdon tube pressure transducer 10 has a filament member 40 between the second end plate 34 and the support structure 20. In that regard, the Bourdon tube pressure transducer may include filament members 40 at both ends or either one of the ends of the crystalline sensor 30.

Figure 3:
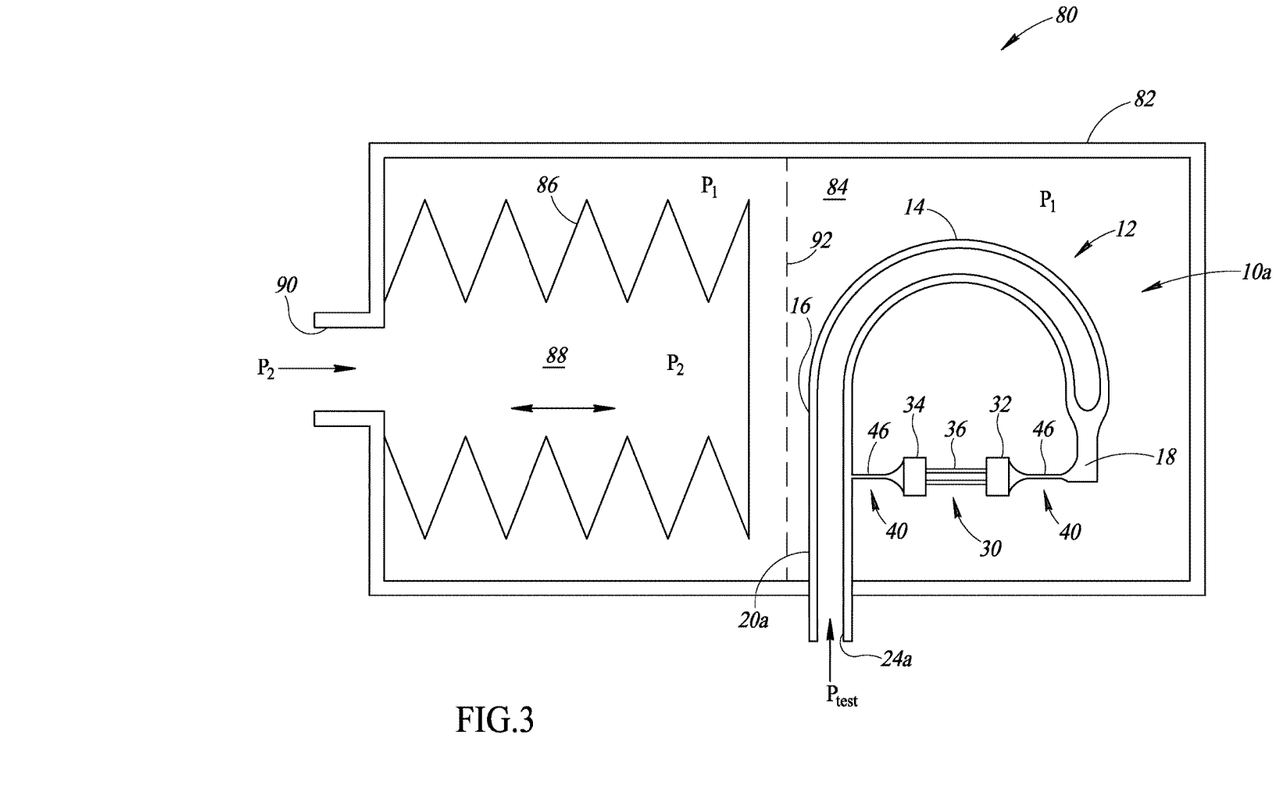
FIG. 3 is a schematic illustration of a pressure stabilizing system that includes a Bourdon tube pressure transducer in accordance with one embodiment.

FIG. 3 is a schematic illustration of a pressure stabilizing system 80 that includes a Bourdon tube pressure transducer 10a in accordance with at least one embodiment. The Bourdon tube pressure transducer 10a is substantially similar in structure and function to the Bourdon tube pressure transducer 10 of FIG. 1 except that the second end plate of the crystalline sensor 30 is also coupled to the support structure by a filament member 40 and the support structure has a different orientation. In particular, the support structure 20a of FIG. 3 extends in the same direction as the open end 16 of the tube 14 and has an opening 24a at an end thereof.

As will be explained below, the pressure stabilizing system 80 is configured to adjust for changes in pressure in the external environment to which the Bourdon tube pressure transducer 10a may be exposed. In that regard, the pressure stabilizing system 80 is able to accommodate for the changes in external pressure without affecting stress being applied to the Bourdon tube pressure transducer 10a. In particular, the pressure stabilizing system 80 is able to vary the volume inside the pressure stabilizing system 80.

The pressure stabilizing system 80 includes a body 82 having an inner cavity 84 that is sealed from an external environment. The Bourdon tube mechanism 12 and the crystalline sensor 30 are located in the cavity 84 of the body 82, while the support structure 20a of the Bourdon tube pressure transducer 10a extends from the cavity 84 and has an opening 24a to be placed in fluid communication with an environment or device to undergo testing.

The body 82 places the Bourdon tube mechanism 12 and the crystalline sensor 30 in a controllable environment, protecting them from humidity and particles, which can affect the accuracy of Bourdon tube's measurements. The cavity 84 has an internal pressure $P_1$. The opening 24a of the support structure 20a is in fluid communication with an environment to be placed under test, which is referred to as a test pressure $P_{test}$.

Inside the cavity 84 is a bellows 86 coupled to the body 82. Inside the bellows 86 is an inner portion 88 that is sealed from the cavity 84. The inner portion 88 is in fluid communication with the environment that is external to the pressure stabilizing system 80. The bellows 86 varies the volume in the cavity 84 by expanding and contracting in response to changes in pressure in the external environment and in the inner portion 88. In particular, the bellows 86 expands and contracts by moving in the directions of the arrow like an accordion to equalize the pressure $P_1$ in the cavity 84 with a pressure $P_2$ in the inner portion 88 of the bellows 86.

As mentioned above, the inner portion 88 of the bellows 86 is in fluid communication with the external environment by an opening 90 in the body 82 and has a pressure $P_2$, while inside the cavity 84 of the pressure stabilizing system 80, an outer portion of the bellows 86 is exposed to pressure $P_1$. In operation, when the pressure stabilizing system 80 is moved from a first external environment at a first pressure to a second external environment at a second, higher pressure, the bellows 86 expands, thereby moving toward the Bourdon tube pressure transducer 10a. That is, when pressure $P_2$ increases, the bellows 86 expands. The bellows 86 expands until the forces acting on the interior and exterior of the bellows 86 by pressures $P_2$ and $P_1$, respectively, equalize.

Conversely, when the pressure stabilizing system 80 is moved from a first external environment at a first pressure to a second external environment to a second, lower pressure, the bellows 86 contracts, thereby moving away from the Bourdon tube pressure transducer 10a. That is, when pressure $P_2$ decreases, the bellows 86 contracts. The bellows 86 contracts until the forces acting on the interior and exterior of the bellows 86 by pressures $P_2$ and $P_1$, respectively, equalize.

The bellows 86 may be made from any material that suitably equalizes the pressure $P_2$ inside the bellows 86 with the pressure $P_1$ inside the cavity 84. In at least one embodiment, the bellows 86 is a plastic material such as a resin, which in one embodiment is polyethylene.

In the illustrated embodiment, the pressure stabilizing system 80 includes a screen 92 that prevents the bellows 86 from overexpanding and touching the Bourdon tube pressure transducer 10a. The screen 92 has openings so that the cavity 84 of the body 82 is at the same pressure $P_1$ throughout the cavity 84.

It is to be appreciated that in another embodiment the pressure stabilizing system may include the Bourdon tube pressure transducer 10 of FIG. 1 in another embodiment.

Figure 4:
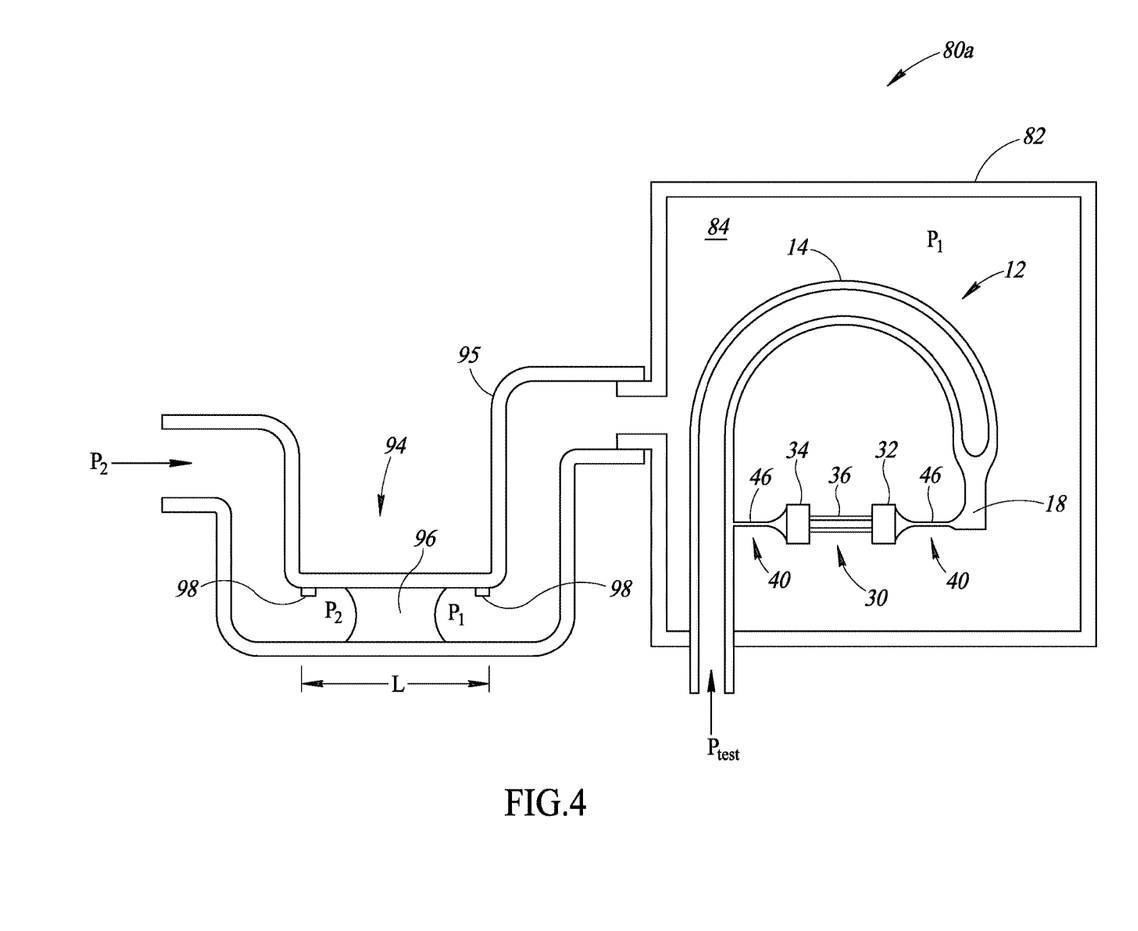
FIG. 4 is a schematic illustration of a pressure stabilizing system that includes a Bourdon tube pressure transducer in accordance with another embodiment.

FIG. 4 is directed to another pressure stabilizing system 80a in accordance with another embodiment. The pressure stabilizing system 80a is substantially the same in structure and function as the pressure stabilizing system 80 of FIG. 3 except that the pressure stabilizing system 80a of FIG. 4 uses a different mechanism for stabilizing the pressure. The pressure stabilizing system 80a of FIG. 4 utilizes a fluidic system 94 to equalize the pressure $P_1$ in the cavity 84 of the body 82 with the pressure $P_2$ in the environment external to the pressure stabilizing system 80a.

As shown in FIG. 4, the fluidic system 94 includes a tube 95 having a first end that is coupled to and in fluid communication with the cavity 84 of the body 82 housing the Bourdon tube pressure transducer 10a. A second end of the tube 95 is in fluid communication with the external environment. The tube 95 includes a liquid 96 configured to move within the tube 95 to adjust for changes in pressure $P_2$ in the external environment.

The tube 95 has a horizontal portion having a length L. In the horizontal portion the liquid 96 moves to equalize the pressure $P_1$ in the cavity 84 with the pressure $P_2$ in the external environment. For instance, as pressure $P_2$ in the external environment increases, the liquid 96 moves towards the Bourdon tube pressure transducer 10a. Conversely, as the pressure $P_2$ in the external environment decreases, the liquid 96 moves away from the Bourdon tube pressure transducer 10a. The length L of the horizontal portion is of a suitable length such that the fluid 96 can move along the length L for all pressure ranges for which the pressure stabilizing system 80a will be exposed.

The pressure stabilizing system 80a may include a detection mechanism 98 that is configured to detect when the liquid 96 moves toward either end of the horizontal portion. In the illustrated embodiment, the detection mechanism 98 is electrical contacts in an inner surface of the tube 95 at opposing ends of the horizontal portion. Although not shown, the electrical contacts have conductive wires coupling the electrical contacts to an electrical component, such as the microprocessor 72 of FIG. 2.

The liquid 96 may be any liquid suitable to remain in the tube for operating periods of the pressure stabilizing system 80a. Preferably, the liquid 96 does not readily evaporate in the environment to which it is exposed. Thus, in some embodiments the liquid 96 has a low vapor pressure such that it does not readily evaporate. In one embodiment, the liquid is Fluorinert™.

In this embodiment, the liquid 96 is a conductive liquid and upon the liquid 96 moving toward one end of the horizontal portion and coming in contact with the electrical contacts of detection mechanism 98, a signal is generated and communicated to the microprocessor 72, which may send a signal to the user interface 76 of the calibration instrument 70.

Figure 5:
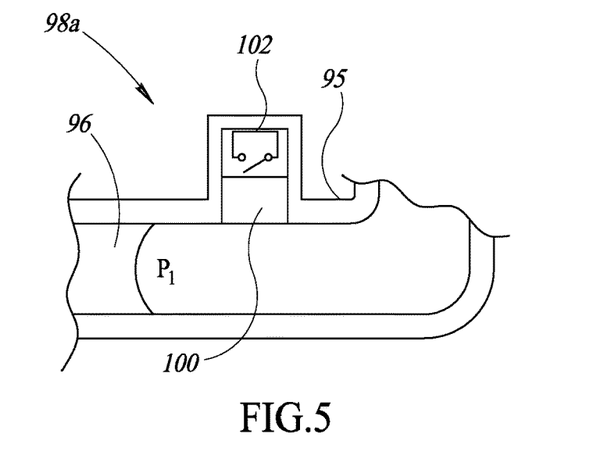
FIG. 5 is a schematic illustration of detection mechanism for use in the pressure stabilizing system of FIG. 4 in accordance with another embodiment.

FIG. 5 shows another detection mechanism 98a that may be used in the tube 95 of the pressure stabilizing system 80a of FIG. 4. The detection mechanism 98a of FIG. 5 performs the same function as the detection mechanism 98 of FIG. 4, that is, to indicate when the liquid 96 in the tube 95 is close to an end of the horizontal portion. The detection mechanism 98a is located at an inner surface of the tube 95 and includes a porous material 100 and a switch 102 located proximate the porous material 100. The porous material 100 is configured to expand upon contact with the liquid 96. As the porous material 100 expands, the porous material 100 causes the switch 102 to flip to change its state.

The pressure stabilizing system 80 of FIGS. 3 and 80a of FIG. 4 may be in the calibration instrument 70 of FIG. 2 as the pressure transducer 10a. In one embodiment, the switch 102 is coupled to the microprocessor 72 and communicates this change of state to the microprocessor 72, which may be further communicated to the user interface.

Figure 6:
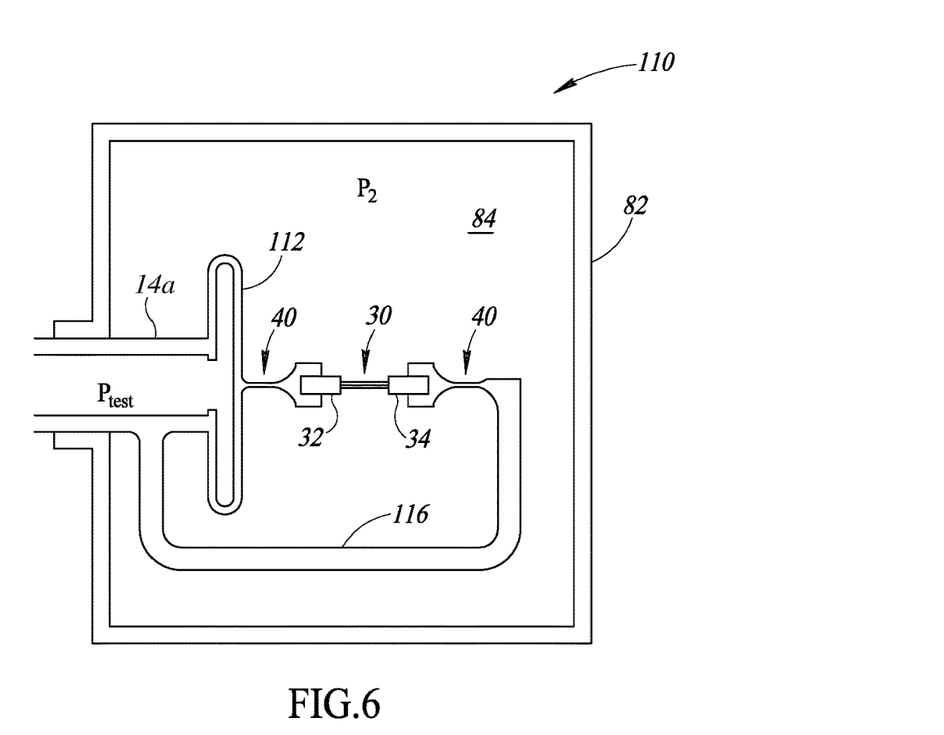
FIG. 6 is a schematic illustration of a membrane pressure transducer in accordance with one embodiment.

FIG. 6 is a schematic illustration of a membrane pressure transducer 110 in accordance with at least one embodiment. Many components, such as the crystalline sensor 30 and the filament member 40, of the membrane pressure transducer 110 are similar in structure and function to the Bourdon tube pressure transducer 10 of FIGS. 1A and 1B and the Bourdon tube pressure transducer 10a of FIGS. 3 and 4, except that the membrane pressure transducer 110 does not include a Bourdon tube mechanism 12. Rather, the membrane pressure transducer 110 includes a flexible membrane 112 that flexes in response to changes in pressure.

The membrane pressure transducer 110 includes a tube 14a having an inlet for being placed in fluid communication with a device to undergo testing. The tube 14a opens to an inner cavity that is formed, in part, by the flexible membrane 112. A crystalline sensor 30 is coupled to the flexible membrane 112 to sense the movement of the membrane. In particular, a first end plate 32 of the crystalline sensor 30 is coupled to the flexible membrane 112 and a second end plate 34 is coupled to a support structure 116. In particular, a first end of the support structure 116 is coupled to the second end plate 34 of the crystalline sensor 30 by a filament element 40 and a second end of the support structure 116 is coupled to the tube 14a. A filament element 40 is located between the first end plate 32 and the flexible membrane 40. Various components of the membrane pressure transducer 110 are made from amorphous quartz. For instance, the tube 14a, the flexible membrane 112, the support structure 116, and the filament elements may be made of amorphous quartz that are coupled together using the methods discussed above.

The flexible member 112 is located inside a cavity 84 of a body 82. The cavity 84 has a pressure $P_2$. The open end of the tube 14a is placed in fluid communication with an environment or device to undergo testing, which has a pressure $P_{test}$.

In operation, when a test pressure $P_{test}$ is higher than the pressure $P_2$, the flexible membrane 112 moves to the right toward the crystalline sensor 30, thereby causing the crystalline sensor 30 to be placed under compression. When a test pressure $P_{test}$ is less than the pressure $P_2$, the flexible membrane 112 moves to the left, thereby causing the crystalline sensor 30 to be placed under tension.

The membrane pressure transducer 110 may be the pressure transducer 10a of the calibration instrument 70 of FIG. 2.

The various features and embodiments described above can be combined in any manner to provide further embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the specific embodiments disclosed.

The invention claimed is:

1. A pressure transducer comprising:
   a Bourdon tube mechanism of amorphous quartz having a tube with a closed end and an open end, the open end of the tube being configured to be placed in fluid communication with a fluid and to receive the fluid into the tube, the closed end of the tube being configured to flex in response to a change in pressure in the tube;
   a support structure of amorphous quartz coupled to the Bourdon tube mechanism without an adhesive material; and
   a crystalline quartz sensor coupled between the closed end of the tube and the support structure, wherein the crystalline quartz sensor is in tension or compression for the operating range of the pressure transducer.

2. The pressure transducer of claim 1, wherein the crystalline quartz sensor is coupled between the closed end of the tube and the support structure without an adhesive material.

3. The pressure transducer of claim 2, further comprising one or more filaments, each filament coupled to an end of the crystalline quartz sensor, the filament having a dimension that is 0.5% to 15% of a dimension of the tube.

4. The pressure transducer of claim 3, wherein the filament is made of amorphous quartz.

5. The pressure transducer of claim 1, wherein the support structure includes a channel that has a first end that is in fluid communication with the open end of the Bourdon tube mechanism and a second end that is open and configured to receive the fluid.

6. The pressure transducer of claim 1, wherein the crystalline quartz sensor is in tension when in the Bourdon tube mechanism is in a neutral position.

7. The pressure transducer of claim 1, wherein the crystalline quartz sensor is a resonant sensor.

8. A pressure transducer comprising:
   a flexible member made of amorphous quartz, the flexible member being configured to move in response to pressure changes;
   a support structure coupled to the flexible member; and
   a crystalline quartz sensor having a first end coupled to the flexible member and a second end coupled to the support structure, wherein the first and second ends of the crystalline quartz sensor are molecularly bonded to the flexible member and the support structure, respectively, and the crystalline quartz sensor is configured to detect a force associated with movement of the flexible member.

9. The pressure transducer of claim 8, wherein the flexible member is a Bourdon tube mechanism that is C-shaped.

10. The pressure transducer of claim 8, wherein the flexible member is one of a Bourdon tube mechanism that includes a tube with an open end to receive a fluid and a closed end and a flexible diaphragm.

11. The pressure transducer of claim 10, wherein the first end of the crystalline quartz sensor is coupled to the closed end of the tube by a filament made of amorphous quartz, wherein the filament has a diameter that is less than a diameter of the tube.

12. The pressure transducer of claim 11, wherein the filament has a cross-sectional area that is less than one hundred times a cross-sectional area of the tube.

13. The pressure transducer of claim 8, wherein the crystalline quartz sensor remains in tension or compression for the operating range of the pressure transducer.

14. The pressure transducer of claim 8, wherein the crystalline quartz is in a pre-tensioned position when exposed to absolute atmospheric pressure.

15. A calibration instrument comprising:
   a pressure transducer including:
      a Bourdon tube made of amorphous quartz and having a closed end and an open end, the open end configured to receive a fluid, the closed end configured to flex in response to a change in pressure in the Bourdon tube; and
      a crystalline quartz sensor coupled to the closed end of the Bourdon tube, wherein the crystalline quartz sensor is in tension or compression for an operating range of the pressure transducer; and
   a microprocessor coupled to the pressure transducer.

16. The calibration instrument of claim 15, wherein the crystalline quartz sensor is molecularly coupled to the closed end of the Bourdon tube without an adhesive material therebetween.

17. The calibration instrument of claim 15, wherein the crystalline quartz sensor remains in tension or compression for the entire operating range of the pressure transducer.

18. The calibration instrument of claim 15, wherein a first end of the crystalline quartz sensor is coupled to the closed end of the Bourdon tube by a filament, the filament having a cross-sectional area that is less than a cross-sectional area of the Bourdon tube.

19. The calibration instrument of claim 18, wherein the filament is made of amorphous quartz.

20. The calibration instrument of claim 15, wherein the crystalline quartz sensor has a longitudinal axis that is parallel with a tangent of a curving motion of the closed end of the Bourdon tube.

21. The calibration instrument of claim 15, wherein the Bourdon tube is located in a cavity of a pressure stabilizing system, and the pressure stabilizing system is configured to equalize a first pressure in the cavity with a second pressure in an environment external to the pressure stabilizing system.

22. The calibration instrument of claim 21, wherein the pressure stabilizing system includes a bellows or a fluidic system to equalize the first pressure in the cavity with the second pressure in the environment external to the pressure stabilizing system.

* * * * *

UNITED STATES PATENT AND TRADEMARK OFFICE
CERTIFICATE OF CORRECTION

PATENT NO. : 10,119,874 B2
APPLICATION NO. : 15/222711
DATED : November 6, 2018
INVENTOR(S) : Timothy Byron Brown and Eric Lane Solis Page 1 of 1

It is certified that error appears in the above-identified patent and that said Letters Patent is hereby corrected as shown below:

In the Claims

Column 10, Claim 1, Line 41:
"for the operating range" should read, --for an operating range--.

Column 10, Claim 6, Line 57:
"when in the Bourdon" should read, --when the Bourdon--.

Column 11, Claim 13, Line 23:
"for the operating range" should read, --for an operating range--.

Column 12, Claim 17, Line 11:
"for the entire operating range" should read, --for an entire operating range--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*